No. 821,025. PATENTED MAY 22, 1906.
J. B. DAVIES.
NAIL OR SCREW FOR SECURING CORRUGATED IRON.
APPLICATION FILED JAN. 27, 1903.
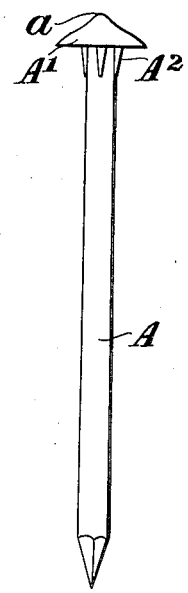
Fig. 1.
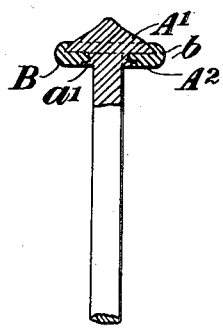
Fig. 2.
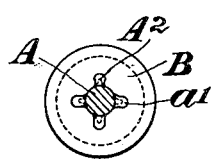
Fig. 3.
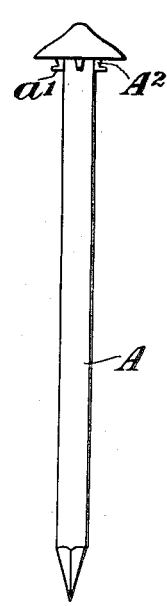
Fig. 4.
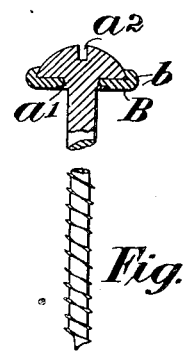
Fig. 5.
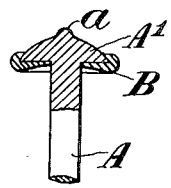
Fig. 6.
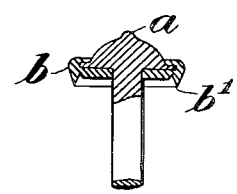
Fig. 7.
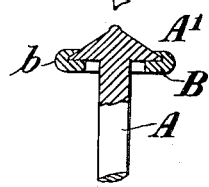
Fig. 8
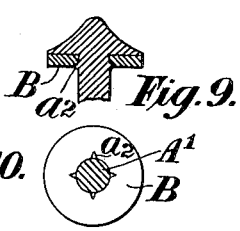
Fig. 9.
Fig. 10.
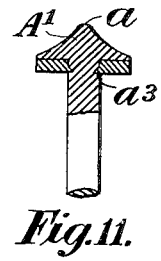
Fig. 11.
WITNESSES
H. M. Kuehne
J. M. Dowling
INVENTOR
Joseph Bartlett Davies
BY Richards
ATTORNEYS

UNITED STATES PATENT OFFICE.

JOSEPH BARTLETT DAVIES, OF MALVERN, VICTORIA, AUSTRALIA.

NAIL OR SCREW FOR SECURING CORRUGATED IRON.

No. 821,025.  Specification of Letters Patent.  Patented May 22, 1906.

Application filed January 27, 1903. Serial No. 140,710.

*To all whom it may concern:*

Be it known that I, JOSEPH BARTLETT DAVIES, accountant, of Elouera, Wheatland Road, Malvern, in the State of Victoria, Commonwealth of Australia, have invented certain new and useful Improved Nails or Screws for Securing Corrugated Iron; and I do hereby declare that the following is a full, clear, and exact description of the same.

This invention relates to an improved nail or screw for securing corrugated iron for roofing, fencing, and other purposes.

It consists of a solid-head nail of the wire-nail type or a screw provided with a soft-metal bearing surface, sheathing, or ring under the nail or screw head, said soft-metal part being secured, as hereinafter explained, without the aid of washers and without having to reduce the diameter of the shank under the head, such as by slicing the metal of the shank upward to form a sort of bur or annular rivet. The soft-metal part of nail-head is designed to provide a pliable seating cushion or rim which will conform to the shape of the corrugated sheet and make a tight joint when driven against it without indenting the corrugated sheet. The crown or upper part of said solid head is in no case covered with soft metal, and hence hammer-blows given the nail when being driven are made upon the hard solid metal of the nail. The nail or screw prior to the soft-metal part being affixed may be ungalvanized or galvanized or be otherwise coated to prevent rust. Said soft-metal part of the head may be of such as lead, and it may either be secured in position upon a blank nail by pressure between dies or be cast about the solid head or be secured by a combined casting and pressure process.

The invention will now be described, aided by a reference to the accompanying sheet of drawings, in which the nail is shown to a scale about twice its usual size in order to clearly illustrate the invention, and in which drawings—

Figure 1 shows a blank nail suitable for my invention provided with webs or ribs on the shank under the solid head and formed as a continuation therefrom; Fig. 2, a central section in part of the nail shown in Fig. 1 after the soft-metal part has been secured under or about the nail-head; Fig. 3, an under side plan of the nail-head shown in Fig. 2; Fig. 4, a side view of the nail shown in Fig. 2 with the soft-metal part removed in order to exhibit the formation of the burs which are formed by forcing the lower part of the ribs upward to assist in holding said soft-metal part in position; Fig. 5, a central section showing the soft-metal part upon or about a screw-head. Figs. 6, 7, and 8 show modifications, partly in section, in the shape of both the solid head and the soft-metal part of the nail; Fig. 9, a central section showing the soft-metal part secured under the head by burs formed on the shank. Fig. 10 is an under side plan of Fig. 9, and Fig. 11 shows the soft-metal part or bearing-piece held in position by being pressed or cast into shallow indentations formed in the shank.

A is the nail-shank, having a solid head A', which may be of any suitable shape and diameter, and $A^2$ represents small webs or ribs made solid with the nail shank and head, and which parts form the nail-blank. B is the attached soft-metal bearing piece, sheathing, or ring, which may wholly or only partly cover the under surface of head, but in every case covering the under marginal surface to form the pliable seating cushion or rim. The upper portion of the nail-head has a striking center $a$ formed either by the gradual elevation toward the crown part or by a central protuberance. The under portion of the solid head is preferably flat, except in regard to the webs or projections $A^2$, which are formed on the nail-blank, and when securing the soft-metal part are forced and curled upward and outward by dies, so as to form burs or projections $a'$, which clench and secure the inner marginal edge of the soft-metal part or bearing-surface B in position without in any way impairing the strength of nail by reducing the size of its shank.

The soft-metal part or bearing-surface B may extend from the shank of the nail to beyond the circumference of the solid head and be curled up or passed over its peripherical edge or margin, as shown at $b$ in Figs. 2, 5, 6, and 7, or it may be in the form of an annulus or ring B under the head at or near its circumference and curled over its edge, as shown at $b$ in Fig. 8, or the said soft-metal part may simply cover the under surface of head and be secured by burs $a^2$ upon or in indentations $a^3$ in the shank, as shown in Figs. 9, 10, and 11.

The lower surface of the soft-metal part or bearing-surface may be flat, as shown in Figs. 2, 5, 8, 9, and 11, or it may be concaved, as shown in Fig. 6, or it may have a downwardly-projecting ring $b'$ at or near its outer edge, as shown in Fig. 7, and which ring will allow it to more readily yield to the shape of the iron when driven. The soft-metal under surface of the head is attached to the solid nail either by pressure between suitable dies or by being cast thereon and be so attached by being made to overlap the edge of the solid head in parts or all round and by means of projections or small indentations on the nail-shank. In a similar manner to that already described the soft-metal bearing part, sheathing, or ring B may be secured to a screw-nail, as shown in Fig. 5, wherein the head is provided with a driver-slot $a^2$.

It will be noted that in every case the crown or top of the hard-metal solid head is left bare, so that when the nails are being hammered home the solid metal of the head directly above the shank receives the blow, and, further, it will be noted that in no case are washers used to secure the soft-metal part on the nail or screw and also that the strength of the soft-metal part is not relied on to hold the corrugated iron in position by being cup-shaped or of great thickness, but that it is so formed as simply to act as a cushion between the solid iron head of the nail and the corrugated iron, said soft-metal part being reinforced all over by said solid head, except in regard to such part as is necessary to overlap for the purpose of securing it in position.

Having now described my invention, what I claim as new, and desire to secure by Letters Patent, is—

1. In combination with a nail having an exposed hard solid head, a soft-metal bearing part extending under the head and up over the edge of the same, substantially as described.

2. In combination, a nail having an exposed hard solid head and spurs formed about the shank and a soft-metal bearing part extending under the head, and held in place by said spurs.

3. In combination with a nail having a hard solid head, the crown whereof is exposed and spurs formed about the shank below the under side of the head, a soft-metal bearing part extending under the head and clenched by said spurs and up over the outer edge of said head.

In witness whereof I have hereunto set my hand in presence of two witnesses.

JOSEPH BARTLETT DAVIES.

Witnesses:
BEDLINGTON BODYCOMB,
W. J. S. THOMPSON.